United States Patent
Minborg et al.

(10) Patent No.: US 7,248,862 B2
(45) Date of Patent: *Jul. 24, 2007

(54) METHOD AND APPARATUS FOR RETRIEVING CALLING PARTY INFORMATION IN A MOBILE COMMUNICATIONS SYSTEM

(75) Inventors: Per-Åke Minborg, Stora Höga (SE); Carl Lundquist, Sollentuna (SE)

(73) Assignee: Sony Ericsson Mobile Communications AB, Lund (SE)

( * ) Notice: Subject to any disclaimer, the term of this patent is extended or adjusted under 35 U.S.C. 154(b) by 887 days.

This patent is subject to a terminal disclaimer.

(21) Appl. No.: 09/766,731

(22) Filed: Jan. 19, 2001

(65) Prior Publication Data

US 2001/0027109 A1    Oct. 4, 2001

Related U.S. Application Data

(60) Provisional application No. 60/176,806, filed on Jan. 19, 2000.

(51) Int. Cl.
*H04M 3/42* (2006.01)
*H04M 15/00* (2006.01)

(52) U.S. Cl. .................... 455/415; 379/140

(58) Field of Classification Search ............... 370/352, 370/353, 354, 355, 356, 359; 455/415, 458, 455/414.1, 411, 456.3, 419, 560, 426.1, 433, 455/445, 456.5, 417, 414.3, 517, 422.1, 564, 455/416, 518, 519, 466, 461, 553.1, 434, 455/436, 438, 439, 440, 567, 462; 709/223, 709/250; 379/140, 136, 133
See application file for complete search history.

(56) References Cited

U.S. PATENT DOCUMENTS

| | | | |
|---|---|---|---|
| 5,157,710 A | 10/1992 | Itoh | |
| 5,289,530 A | 2/1994 | Reese | |
| 5,305,372 A | 4/1994 | Tomiyori | |
| 5,398,279 A * | 3/1995 | Frain | 379/140 |
| 5,561,704 A | 10/1996 | Salimando | |
| 5,840,433 A | 11/1998 | Juma | |
| 5,850,433 A | 12/1998 | Rondeau | |
| 5,920,815 A | 7/1999 | Akhavan | |
| 5,930,699 A | 7/1999 | Bhatia | |
| 5,933,486 A * | 8/1999 | Norby et al. | 379/221.09 |
| 5,991,749 A | 11/1999 | Morrill, Jr. | |
| 6,018,654 A | 1/2000 | Valentine et al. | |
| 6,049,713 A | 4/2000 | Tran et al. | |
| 6,064,887 A | 5/2000 | Kallioniemi et al. | |
| 6,097,942 A | 8/2000 | Laiho | |

(Continued)

FOREIGN PATENT DOCUMENTS

| | | |
|---|---|---|
| EP | 0 84 067 A2 | 10/1991 |
| EP | 0869688 | 10/1996 |
| EP | 0 971 513 A2 | 1/2000 |
| EP | 1041808 | 10/2000 |
| EP | 1 111 505 | 6/2001 |

(Continued)

OTHER PUBLICATIONS

Dalgic, et al., "True Number Portability and Advanced Call Screening in a SIP-Based IP Telephony System", IEEE Communications Magazine, p. 96-101, Jul. 1999.

(Continued)

*Primary Examiner*—Melody Mehrpour
(74) *Attorney, Agent, or Firm*—Hunton & Williams LLP

(57) ABSTRACT

A method and system for providing calling party identification information to a called party in a mobile communications network. Servers external to the mobile communications network are used to generate and provide calling party information in the form of a service page or phone page without relying on calling line interface information.

16 Claims, 4 Drawing Sheets

U.S. PATENT DOCUMENTS

| | | | |
|---|---|---|---|
| 6,112,078 | A | 8/2000 | Sormunen |
| 6,157,708 | A | 12/2000 | Gordon |
| 6,161,134 | A | 12/2000 | Wang et al. |
| 6,169,897 | B1 | 1/2001 | Kariya |
| 6,192,123 | B1 | 2/2001 | Grunsted et al. |
| 6,226,367 | B1 | 5/2001 | Smith et al. |
| 6,243,443 | B1 | 6/2001 | Low et al. |
| 6,253,234 | B1 | 6/2001 | Hunt et al. |
| 6,301,609 | B1 | 10/2001 | Aravamudan et al. |
| 6,356,956 | B1 | 3/2002 | Deo et al. |
| 6,469,998 | B1 | 10/2002 | Salinas et al. |
| 6,470,447 | B1 | 10/2002 | Lambert et al. |
| 6,507,908 | B1 | 1/2003 | Caronni |
| 6,522,875 | B1 | 2/2003 | Dowling et al. |
| 6,549,773 | B1 | 4/2003 | Linden et al. |
| 6,625,644 | B1 * | 9/2003 | Zaras .......................... 709/217 |
| 6,640,240 | B1 | 10/2003 | Hoffman et al. |
| 6,687,340 | B1 | 2/2004 | Goldberg et al. |
| 6,744,759 | B1 * | 6/2004 | Sidhu et al. ................. 370/356 |
| 6,792,607 | B1 | 9/2004 | Burd et al. |
| 6,826,403 | B1 * | 11/2004 | Minborg et al. ............. 455/445 |
| 6,996,072 | B1 * | 2/2006 | Minborg ...................... 370/260 |
| 2002/0059272 | A1 * | 5/2002 | Porter ........................ 707/100 |
| 2002/0068550 | A1 * | 6/2002 | Tejada ........................ 455/414 |
| 2002/0128002 | A1 | 9/2002 | Vu |
| 2003/0050052 | A1 | 3/2003 | Minborg et al. |
| 2003/0060211 | A1 | 3/2003 | Chern et al. |
| 2003/0135586 | A1 | 7/2003 | Minborg |
| 2003/0174684 | A1 | 9/2003 | Pohjanvuori et al. |

FOREIGN PATENT DOCUMENTS

| | | |
|---|---|---|
| EP | 1 128 647 A2 | 8/2001 |
| GB | 2 338 150 A | 8/1999 |
| WO | WO 97/07644 | 2/1997 |
| WO | WO 97/13380 | 4/1997 |
| WO | WO/20441 | 6/1997 |
| WO | WO 98/51056 | 11/1998 |
| WO | WO 99/11078 | 3/1999 |
| WO | 99/55107 | 10/1999 |
| WO | WO 00/04730 | 1/2000 |
| WO | WO 00/38458 | 6/2000 |
| WO | WO 00/64110 | 10/2000 |
| WO | WO 00/77662 A2 | 12/2000 |
| WO | WO 01/05109 | 1/2001 |
| WO | WO 01/54364 | 7/2001 |

OTHER PUBLICATIONS

PCT-International Search Report dated Jun. 13, 2001, for Application No. PCT/SE01/00094, filed Jan. 19, 2001.

Smart Messaging Specification, Revision 2.0.0. Nokia Mobile Phones Ltd., May 17, 1999.

Digital Cellular Telecommunications System (Phase 2), Technical Realization of the Short Message Service (SMS) Point-to-Point (GSM03.40), ETSI, ETS 300 536, Fourth Edition, Oct. 1996.

Commonly Assigned U.S. Appl. No. 09/686,990, entitled "Exchange of Information in a Communication System", filed Oct. 17, 2000.

PCT—International Search Report dated Jun. 13, 2001, for Application No. PCT/SE01/00079, filed Jan. 18, 2001.

PCT—International Search Report dated Jun. 13, 2001, for Application No. PCT/SE01/00094, filed Jan. 19, 2001.

PCT—International Search Report dated Jul. 6, 2001, for Application No. PCT/SE01/00093, filed Jan. 19, 2001.

Lawrence Harte, et al., GSM Superphones, Table of Contents and Chapter 1, p. xi-xxii and 1-22, McGraw-Hill, 1999.

Christian Bettstetter. et al., "GSM Phase 2+ General Packet Radio Service GPRS: Architecutre, Protocols, and Air Interface", IEEE Communications Surveys, <<http://www.comsoc.org/pubs/surveys>>. 13 pages, Third Quarter 1999, vol. 2, No. 3.

PCT—International Search Report for PCT/SE01/00071.

PCT—International Search Report for PCT/SE01/00080.

ETSI TS 101 267 (V.8.5.0) Technical Specification for Digital Telecommunications System (Phase 2+), Specification of the SIM Application Toolkit for the Subcriber Identiy Module—Mobile Equipment (SIM—ME interface) (Global System for Mobile Communications: 1999).

International Search Report for PCT/SE00/01689, issued Dec. 8, 2000, four pages.

Schulzrinne, "A Comprehensive Multimedia Control Architecutre for the Internet", Dept. of Computer Science, Columbia University, New York, NY, IEEE No. 0-7803-3799-9/97, 1997, p. 65-76.

* cited by examiner

METHOD AND APPARATUS FOR RETRIEVING CALLING PARTY INFORMATION IN A MOBILE COMMUNICATIONS SYSTEM

CROSS-REFERENCE TO RELATED APPLICATIONS

This application claims priority from PCT/SE00/01689 which in turn claims priority from U.S. application Ser. Nos. 60/176,806 filed Jan. 19, 2000 and 09/644,307.

BACKGROUND OF THE INVENTION

The present invention generally relates to mobile communications systems. More particularly, the present invention relates to providing calling party identification information to a called party in a mobile communication system.

In the field of mobile communications, it is known to provide calling party information, which may be in the form of a "service page" or "phone page", to a called party's terminal. For example, European Patent Application EP 0869688A2 discloses a method and means for transmitting a service page in a communication system. The service page information is provided to, and displayed on, a terminal associated with a telecommunications network using Calling Line Identification Presentation (CLIP) or Connected Line Identification Presentation (COLP). According to the method, a first subscriber sends a call request to a second subscriber, and CLIP information is transmitted to the second subscriber. The second subscriber contacts an Internet Address Server and transmits the CLIP information. The Internet Address Server locates an Internet address corresponding to the CLIP, if available, and transmits the located Internet address to the second subscriber. The second subscriber's terminal then contacts the Internet address and downloads a service page, which is then displayed on the second subscriber's terminal. The service page includes information characteristic of the first subscriber.

An example of such a system is shown in FIG. 1. A mobile terminal MT1 (associated with network PLMN1) initiates a call to mobile terminal MT(associated with network PLMN2) in step 1 by transmitting a dialed number (corresponding to MT2) to network PLMN1. This step is typically performed when a subscriber (not shown) associated with MT1 inputs the dialed number and pushes a SEND or transmission button on the terminal MT1. After step 1 is performed, the first network PLMN1 sends a message in step 2 to second network PLMN2 requesting that a call be set up with mobile terminal MT2. After step 2 is performed, the second network PLMN2 in step 3 sends a message to second mobile terminal MT2, activating a voice channel to establish the call. The message sent in step 3 also provides an indication of the identity of mobile terminal MT1 in the form of CLI information. Finally, in step 4, the mobile terminal MT2 sends a message to an associated external server PNS2, requesting a service page associated with the calling party based on the CLI information received in step 3.

There are several drawbacks associated with relying on Connected Line Identification (CLI) to effect service page retrieval. A first problem is that the communication network service provider will typically charge an additional fee for CLI distribution. A second problem is that not every service provider is able or willing to exchange numbers or other identification data when subscribers call between different networks; this potentially makes CLI useless for a large number of subscribers. A third problem is that subscribers cannot control individually whether or not their number or service page is to be shown. For example, some subscribers maintain their number in secrecy; since this number is not transmitted when a call is placed, a corresponding service page cannot be retrieved by other parties. Thus, using the CLI technique, it is not useful for a subscriber having an unlisted or secret identification to have a service page.

A further problem with conventional calling party identification techniques is that some technologies or systems do not support CLI techniques or may require additional hardware, such as a fixed telephone line. A still further problem with CLI techniques is that if the CLI information is diverted to another number, the CLI information can be lost in some cases.

It would be desirable to identify a calling party to a called party while avoiding the use of CLI techniques, or in such a way so as to complement or enhance CLI techniques. It would also be desirable to identify a calling party without relying on service providers or the mobile communication networks of the calling and or called parties. It would further be desirable to avoid the problems identified above and to provide additional advantages over conventional CLI-based calling party identification techniques.

SUMMARY OF THE INVENTION

The present invention overcomes the above-noted problems, and achieves additional advantages, by providing for a method, apparatus, and/or system for providing calling party identification information in the form of a phone page to a called terminal, which either avoids or enhances the use of CLI techniques. According to the embodiments disclosed herein, a first mobile terminal transmits a message to a first external server in conjunction with a triggering event such as the transmission of the dialed number to a first communication network. The first external server determines the identity of both the calling party (first terminal) and the called party (second terminal), and transmits this information to a second external server associated with a second communication network and the second terminal. The transmission of the calling party identification information from the first external server to the second external server allows the called party (second terminal) to retrieve the information without relying on the second network to provide CLI information. In another embodiment, the first and second servers are the same, and the first and second networks are the same.

BRIEF DESCRIPTION OF THE DRAWINGS

The present invention can be more fully understood by referring to the following Detailed Description of presently-preferred embodiments in conjunction with the accompanying drawings, in which like reference indicators are used to designate like elements, and in which.

DETAILED DESCRIPTION OF THE INVENTION

Figure 1:
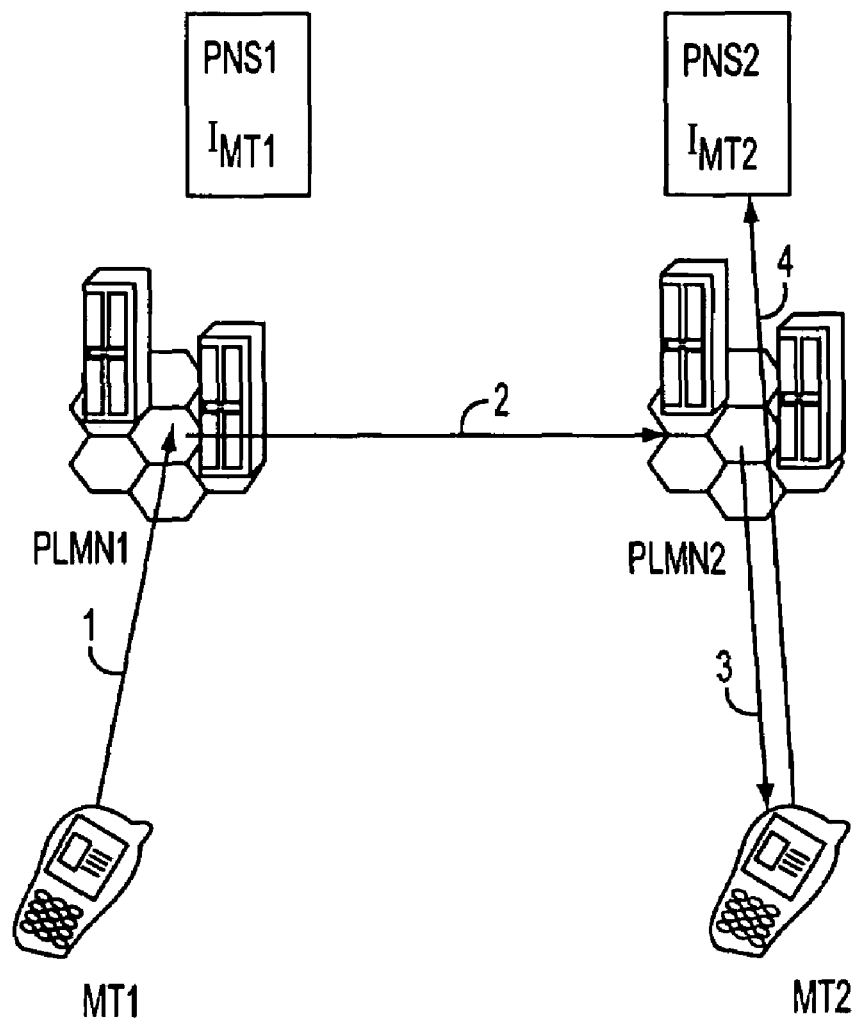
FIG. 1 is a functional diagram of a conventional call connection process using CLI information.
Figure 2:
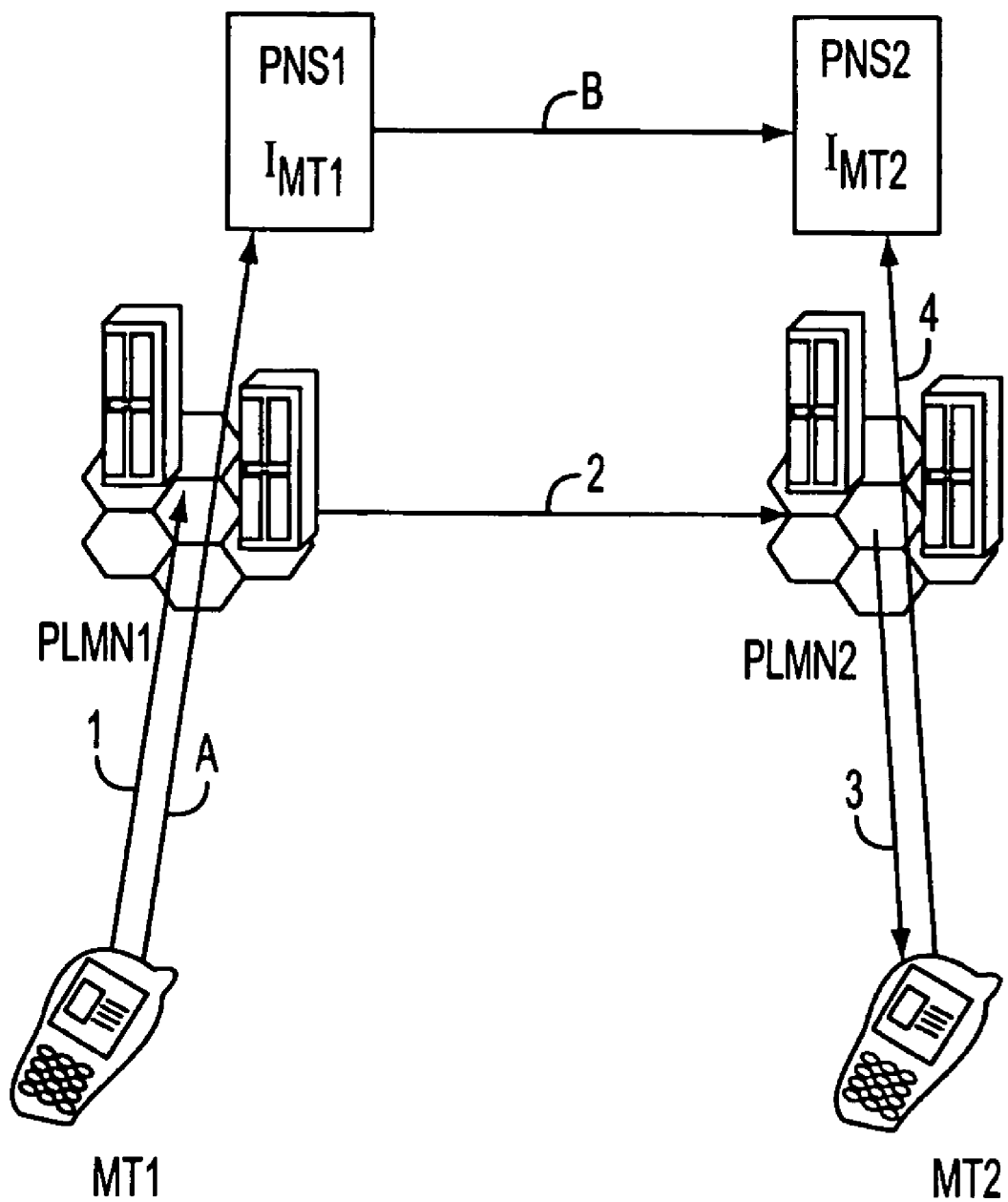
FIG. 2 is a functional diagram of a call connection process according to one embodiment of the present invention.

Referring now to FIG. 2, a functional diagram of a call connection process consistent with a first embodiment of the present invention is shown. In FIG. 2, the first, or calling, mobile terminal MT1 transmits (in response to appropriate subscriber input) a called party telephone number (in this example, the telephone number corresponding to second mobile terminal MT2) to a first public land mobile network PLMN1 in step 1. The first network PLMN1 transmits a message to the second network PLMN2, instructing PLMN2 to establish a voice channel for communication with second terminal MT2 in step 2. In step 3, the second network PLMN2 sends a message to second mobile terminal MT2 to activate a voice channel and, optionally, provide supplemental information such as CLI information. In step 4, the second mobile terminal MT2 transmits a message to a second phone page number service (e.g., a server external to the PLMN communication network) PNS2 to retrieve a service page or phone page containing information about the calling party. It will be appreciate that the foregoing steps 1-4 are substantially the same as in FIG. 1.

According to one implementation of the present invention, substantially simultaneously with the transmission of the calling information to PLMN1, the first mobile terminal MT1 also transmits a data object request signal to a first external server PNS1 in order to retrieve a data object such as a phone page containing information about the called party associated with the second mobile terminal MT2 in step A. Note that this transmission in step A can be performed by first terminal MT1 at the same time as the transmission of the calling information, or can be performed just prior or just after the transmission of the calling information (for example, to avoid using too much of the mobile terminal's limited available power at one time). As a result of step A, the first external server PNS1 now knows or can derive (e.g., by using a procedure such as is described in the copending, commonly-assigned application entitled "Method and Apparatus for Location Event Based Information", having Ser. No. 09/660,055, the entirety of which is incorporated by reference) the public identity of both the first and second mobile terminals MT1 and MT2. The first external server PNS1 retrieves, derives, or otherwise obtains the identity information and transmits this information to the second external server PNS2 over a second communication link independent of the link or channel used to transmit information between the first and second external servers in step 2. Preferably, the timing of transmissions in steps A and B is such that the information containing the identity and/or phone page information for the calling party is provided in step B to the second external server PNS2 before steps 2, 3, and 4 are completed, so as to allow the second external server PNS2 to provide requested phone page information to the second mobile terminal MT2 substantially immediately, or at least sooner than having to derive the phone page information based on CLI information transmitted to the second network PLMN2 in step 4.

Note that the requested phone page information can include a pointer or address of a phone page, or the actual phone page itself.

In an alternative embodiment, the second network PLMN2 can be set up (e.g., by appropriate software programming) to provide the phone page information requested in step 4 by either using the CLI information (if this has been provided to the second mobile terminal MT2 in step 3 and provided to the second external server PNS2 in step 4), or using the phone page information provided by the first external server in step B, whichever occurs first or which results in the requested phone page information being provided to the second mobile terminal MT2 in the shortest period of time.

Figure 3:
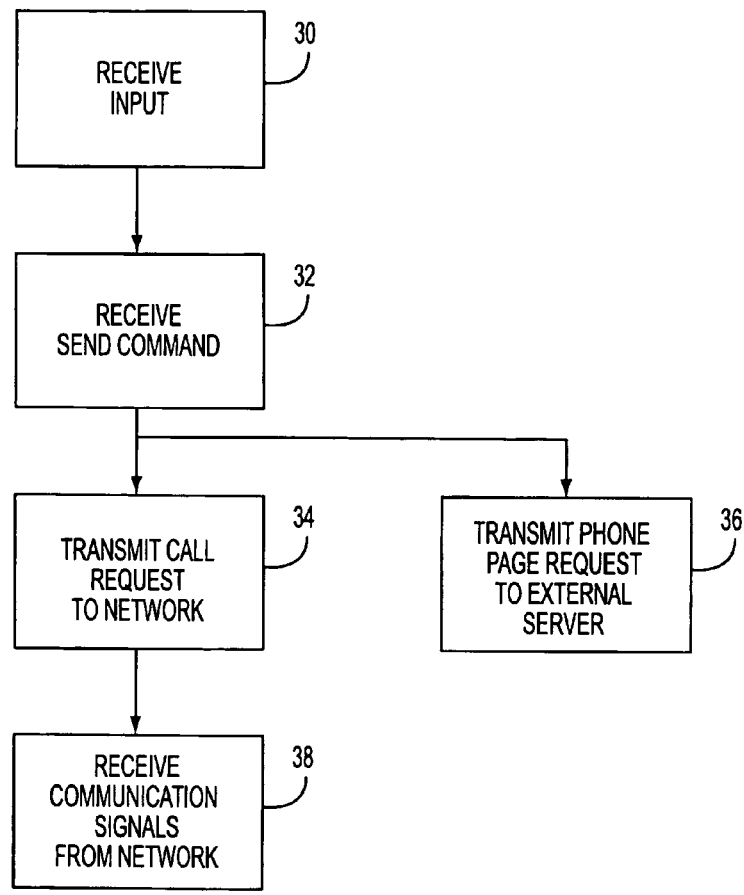
FIG. 3 is a flow chart describing an exemplary method for handling a call set up in a calling party's terminal, according to one aspect of the present invention.

Referring now to FIG. 3, a flow chart describing a method performed by the first mobile terminal MT1 in the embodiment of FIG. 2. Such a method can be implemented using a suitably programmed processor resident in the mobile terminal MT1. In step 30, the mobile terminal receives an input (e.g., via a keypad) of a telephone number to be called. In step 32, the mobile terminal receives a SEND or similar command to initiate a call to the called telephone number. In step 34, the mobile terminal transmits an appropriately-formatted signal, including the called telephone number, to the first network PLMN1. Substantially simultaneously with step 34, the mobile terminal in step 36 transmits a data object request (e.g., for a phone page corresponding to the called mobile terminal) to the first external server PNS1. It will be appreciated that step 36 can be performed just prior to, simultaneously with, or just after step 34, with the goal being to ensure that the first external server PNS1 can provide phone page information for the calling terminal MT1 to the second external server PNS2 before the second external server receives the phone page request from the second terminal MT2. In step 38, after a voice channel has been established with mobile terminal MT2, the mobile terminal MT1 receives communication from mobile terminal MT2.

Figure 4:
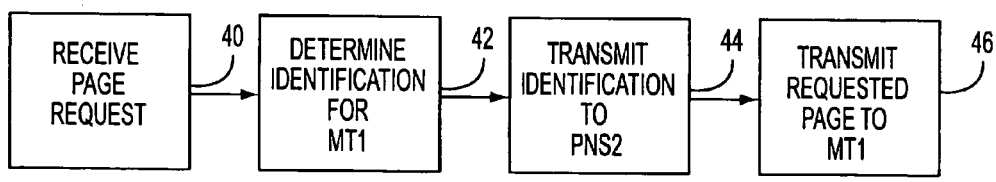
FIG. 4 is a flow chart describing an exemplary method for handling a call set up in a first external server according to another aspect of the present invention.

Referring now to FIG. 4, a flow chart describing a method performed by the first external server PNS1 in the embodiment of FIG. 2. Such a method can be implemented using a suitably programmed processor resident in the first external server PNS1. In step 40, the first external server receives a phone page request, including a called number for which a phone page or other data object is desired, from mobile terminal MT1. In step 42, the first external server determines, from the phone page request, identification information for both the calling terminal MT1 and the called terminal MT2. In step 44, the first external server transmits the identification information for the calling terminal MT1 to the second external server PNS2 which is associated with the called terminal MT2. In step 46, the first external server returns requested phone page information for the called terminal MT2 to the requesting terminal MT1. It will be appreciated that sequence of steps 40-46 can be revised as necessary, preferably keeping in mind the goal of providing the identification information for MT1 to the second external server prior to the second external server's receipt of a phone page request from the second terminal MT2.

Figure 5:
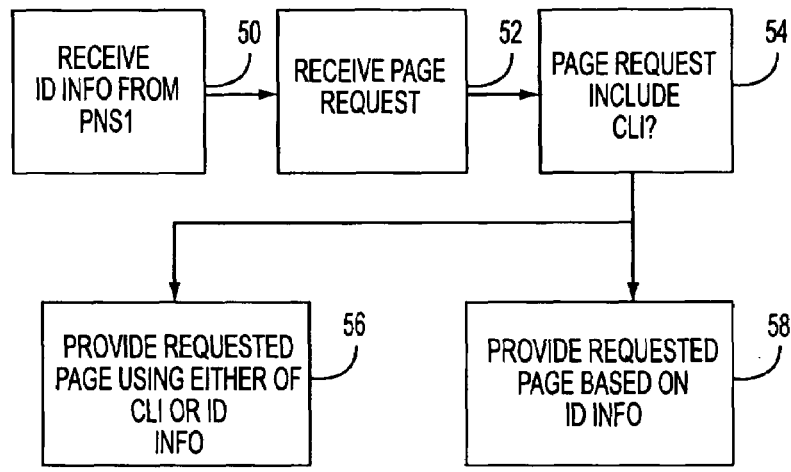
FIG. 5 is a flow chart describing an exemplary method for handling a call set up in a second external server according to another aspect of the present invention.

Referring now to FIG. 5, a flow chart describing a method performed by the second external server PNS2 in the embodiment of FIG. 2. Such a method can be implemented using a suitably programmed processor resident in the second external server PNS2. In step 50, the second external server PNS2 receives identification information for the calling terminal MT1 from the first external server PNS1. The identification information can be the phone page information for terminal MT2 or can be information which allows the second external server PNS2 to derive the phone page information for the terminal MT2. In step 52, the second external server PNS2 receives a phone page request from called terminal MT2. In step 54, the second external server PNS2 determines whether the phone page request includes CLI information. If CLI information is included, the second external server responsively generates and provides the requested phone page information using: 1) the calling information received in step 50, or 2) the CLI information provided in step 54, whichever provides the fastest result. If the CLI information is not included in the phone page request from the second terminal MT2, the second external server PNS2 responsively provides, in step 56, the requested phone page information based on the information received in step 50. It will be appreciated that step 54 can be omitted, and the second external server can automatically provide the requested phone page information based solely on the information received in step 50.

Figure 6:
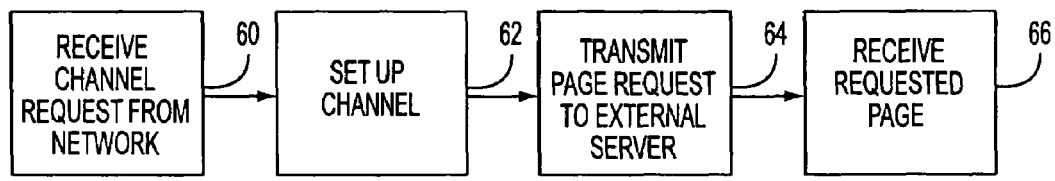
FIG. 6 is a flow chart describing an exemplary method for handling a call set up in a called terminal according to an additional aspect of the present invention.

Referring now to FIG. 6, a flow chart describing a method performed by the second, called mobile terminal MT2 in the example of FIG. 2. Such a method can be implemented using a suitably programmed processor resident in the second mobile terminal MT2. In step 60, the second mobile terminal MT2 receives a channel set up request signal (which may or may not include CLI information) from the second network PLMN2, which is the current service provider for the terminal MT2. In step 62, the mobile terminal MT2 completes the communication link with mobile terminal MT1 via networks PLMN1 and PLMN2. In step 64, the second mobile terminal transmits a phone page request to the second external server PNS2, requesting the phone page corresponding to the calling party. As indicated above, the phone page request may or may not include CLI information, depending upon whether or not the channel set up request includes the CLI information. In step 66, the second mobile terminal MT2 receives the requested phone page information.

The foregoing description has focused on a call as a triggering event to initiate the processes in the foregoing embodiments. It should also be appreciated that other triggering events can trigger the processes above. Such triggering events can include, by way of example, the following:
An outgoing call is or is about to be initiated.
An addressed B-party answers a call.
An incoming call is imminent or has just started.
A conference call is or is about to be initiated.
A call is disconnected
A call is conducted (under which several triggering events can be generated).
A subscriber is put on hold.
A new cell in the PLMN has been selected.
The location of a subscriber has changed.
A new Public Land Mobile Network (PLMN) operator is selected.
A new country of registration is made.
A UE is about to be switched off.
A UE has been switched on.
When a designated button on a UE is pressed.
In response to a talk spurt received by a UE.
A voice mail has been left to a subscriber.
An SMS has been sent or received by a subscriber.

Further, information indicative of which "triggering event" initiated the phone page process can be transferred to MT2 (via suitably-programmed software instructions).

While the foregoing description includes numerous details, it will be understood that these are provided solely for purposes of explaining the presently-preferred embodiments of the present invention. Such details should not be deemed to constitute limitations of the invention, as the embodiments described above can be varied in many ways by those skilled in the art without departing from the spirit and scope of the invention, as defined by the following claims and their legal equivalents.

What is claimed is:

1. A method for communicating between first and second communication devices in a telephone connection for voice communications, comprising:
receiving, at a server associated with the first communication device, a first signal from the first communication device, the first signal comprising a first request for a data object associated with a second communication device and including at least an identity of the second device;
providing the first communication device the data object associated with the second communication device;
as a result of the first request by the first communication device, providing identification information of the first communication device that enables the second communication device to access a data object associated with the first communication device; and
providing to the second communication device a data object associated with the first communication device based on the provided identification information of the first communication device;
wherein the second communication device is provided a data object associated with the first communication device only if the first communication device requested a data object associated with the second communication device; and
wherein the data objects have at least one of visual information and aural information that is to be presented to a requesting party.

2. The method of claim 1, wherein the first signal includes a dialed number corresponding to the second communication device and an identification of the first communication device.

3. The method of claim 1, wherein the data object provided to the second communication device that is associated with the first communication device is rendered without using calling line identification (CLI) information of the first communication device.

4. A method for communicating between a second communication device and a first communication device in a telephone connection for voice communications, comprising the steps of:
identifying, at the second communication device, the occurrence of a triggering event;
transmitting to a server associated with the second communication device a request for a data object associated with the first communication device; and
receiving the requested data object from the second server;
wherein the request for a data object by the second communication device for a data object associated with the first communication device is fulfilled only if the first communication device requested a data object associated with the second communication device; and
wherein the data objects have at least one of visual information and aural information that is to be presented to a requesting party.

5. The method of claim 4, wherein the triggering event does not include calling line identification (CLI) information of the first communication device.

6. The method of claim 4, wherein the triggering event includes a calling line identification information of the first communication device, but wherein the requested data object associated with the first communication device that is provided to the second communication device is not derived on the basis of the calling line identification information.

7. The method of claim 4, wherein the requested data object associated with the first communication device that is provided to the second communication device is generated in the server based on calling information provided by a second server associated with the first communication device.

8. The method of claim 4, wherein the data object request for a data object associated with the first communication device does not include calling line identification (CLI) information.

9. The method of claim 4, wherein the data object request for a data object associated with the first communication device includes calling line interface (CLI) information, and wherein the request is serviced by determining whether the requested data object can be provided faster based on the CLI information or faster based on other identification information of the first communication device provided as a result of the first communication device's request for a data object associated with the second communication device, and providing the requested information using the faster technique.

10. The method of claim 4, wherein the data object associated with the first communication device that is provided to the second communication device includes a pointer to a phone page associated with the first communication device.

11. The method of claim 4, wherein the data object associated with the first communication device that is provided to the second communication device includes a phone page associated with the first communication device.

12. The method of claim 4, wherein the data object associated with the first communication device that is provided to the second communication device comprises the public identity of the first communication device.

13. The method of claim 1, wherein the identification information of the first communication device, that is provided as a result of the first communication device's request for a data object associated with the second communication device, comprises the data object itself of the first communication device.

14. The method of claim 1, wherein the identification information of the first communication device, that is provided as a result of the first communication device's request for a data object associated with the second communication device, comprises the public identity of the first communication device that is used to access the data object of the first communication device provided to the second communication device.

15. The method of claim 1, wherein the second communication device is unable to access the data object associated with the first communication device unless the first communication device requests the data object associated with the second communication device.

16. The method of claim 1, wherein the first communication device has a secret or unlisted phone number such that the phone number is not automatically made available to called parties as CLI information.

* * * * *